(12) United States Patent
Song et al.

(10) Patent No.: US 12,411,772 B2
(45) Date of Patent: Sep. 9, 2025

(54) ELECTRONIC APPARATUS AND CONTROL METHOD THEREOF

(71) Applicant: SAMSUNG ELECTRONICS CO., LTD., Suwon-si (KR)

(72) Inventors: Jusun Song, Suwon-si (KR); Kyeonghwan Jung, Suwon-si (KR); Jaehoon Jeong, Suwon-si (KR); Jihun Jung, Suwon-si (KR); Changhyeon Chae, Suwon-si (KR); Youngho Choi, Suwon-si (KR); Jaeook Kwon, Suwon-si (KR); Seokjae Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 18/302,700

(22) Filed: Apr. 18, 2023

(65) Prior Publication Data

US 2023/0259457 A1      Aug. 17, 2023

Related U.S. Application Data

(63) Continuation of application No. PCT/KR2021/013889, filed on Oct. 8, 2021.

(30) Foreign Application Priority Data

Oct. 19, 2020   (KR) .................. 10-2020-0135074

(51) Int. Cl.
*G06F 12/08*   (2016.01)
*G06F 11/14*   (2006.01)
(Continued)

(52) U.S. Cl.
CPC ...... *G06F 12/0871* (2013.01); *G06F 11/1471* (2013.01); *G06F 12/0888* (2013.01)

(58) Field of Classification Search
CPC ...... G06F 12/04; G06F 12/08; G06F 12/0857; G06F 12/0871; G06F 12/0888;
(Continued)

(56) References Cited

U.S. PATENT DOCUMENTS 9,081,702 B2    7/2015  Iyigun et al.
2004/0250254 A1   12/2004  Frank et al.
(Continued)

FOREIGN PATENT DOCUMENTS

JP    2009020555 A    1/2009
JP    2011238266 A    11/2011
(Continued)

OTHER PUBLICATIONS

W. Haque, M. Fontaine and A. Vezina, "Adaptive Deadlock Detection and Resolution in Real-Time Distributed Environments," 2017 IEEE 19th International Conference on High Performance Computing and Communications (Year: 2017).*
(Continued)

*Primary Examiner* — Rocio Del Mar Perez-Velez
*Assistant Examiner* — Julian S Mendel
(74) *Attorney, Agent, or Firm* — Nixon & Vanderhye P.C.

(57) ABSTRACT

An electronic apparatus may include a processor configured to store data of a user process related to a user area assigned to a first memory or a system process related to a system area assigned to the first memory in a second memory, in response to a memory recovery event for the first memory, and allow an area of the first memory corresponding to at least one of the user area or the system area to store other data, and perform one of restoration of the data based on the access of the first process and restoration of the data based on an access of the second process and prevent the other one from being performed, in response to identification of the access of the second process during the access of the first (Continued)

process to the data stored in the second memory through the system area.

19 Claims, 11 Drawing Sheets

(51) Int. Cl.
*G06F 12/0871* (2016.01)
*G06F 12/0888* (2016.01)

(58) Field of Classification Search
CPC .............. G06F 12/1009; G06F 12/126; G06F 11/1448; G06F 11/1469; G06F 11/1471; G06F 11/1666; G06F 11/2094; G06F 9/50; G06F 9/5016; G06F 9/1538; G06F 2212/1008; G06F 2212/1024; G06F 2212/401; G06F 2212/815
See application file for complete search history.

(56) References Cited

U.S. PATENT DOCUMENTS

| | | | |
|---|---|---|---|
| 2005/0235123 A1 | 10/2005 | Zimmer et al. | |
| 2006/0224858 A1 | 10/2006 | Wang et al. | |
| 2007/0294494 A1* | 12/2007 | Conti | G06F 12/126 |
| | | | 711/158 |
| 2010/0023565 A1 | 1/2010 | Colbert et al. | |
| 2011/0066880 A1 | 3/2011 | Byun | |
| 2011/0252424 A1* | 10/2011 | Shen | G06F 9/524 |
| | | | 718/100 |
| 2014/0164545 A1 | 6/2014 | Davis et al. | |
| 2014/0208042 A1* | 7/2014 | Chinya | G06F 12/1027 |
| | | | 711/147 |
| 2015/0242432 A1 | 8/2015 | Bak et al. | |
| 2015/0277772 A1* | 10/2015 | Tan | G06F 3/0604 |
| | | | 711/148 |
| 2016/0234019 A1* | 8/2016 | Goss | H04W 12/102 |
| 2016/0259557 A1* | 9/2016 | Yang | G06F 3/0608 |
| 2018/0032260 A1 | 2/2018 | Malladi et al. | |
| 2018/0107570 A1* | 4/2018 | Hardy | G06F 11/3433 |
| 2018/0365167 A1 | 12/2018 | Eckert et al. | |
| 2021/0004272 A1 | 1/2021 | Hwang et al. | |
| 2021/0034509 A1 | 2/2021 | Choi et al. | |

FOREIGN PATENT DOCUMENTS

| | | |
|---|---|---|
| KR | 20160068481 A | 6/2016 |
| KR | 20160107802 A | 9/2016 |
| KR | 20180013693 A | 2/2018 |
| KR | 20190106623 A | 9/2019 |
| KR | 20190117294 A | 10/2019 |

OTHER PUBLICATIONS

International Search Report for PCT/KR2021/013889 mailed Jan. 25, 2022, 5 pages.
Written Opinion of the ISA for PCT/KR2021/013889 mailed Jan. 25, 2022, 4 pages.

* cited by examiner

ELECTRONIC APPARATUS AND CONTROL METHOD THEREOF

CROSS-REFERENCE TO RELATED APPLICATIONS

This application is a continuation of International Application No. PCT/KR2021/013889 filed on Oct. 8, 2021, in the Korean Intellectual Property Receiving Office and claiming priority to Korean Patent Application No. 10-2020-0135074 filed on Oct. 19, 2020, in the Korean Intellectual Property Office, the disclosures of which are incorporated by reference herein in their entireties.

BACKGROUND

Field

Certain example embodiments relate to an electronic apparatus with a memory for loading and executing various applications on an operating system and a method of controlling the same, and for example to an electronic apparatus, which can perform a memory recovery operation when an available capacity of a memory is insufficient, and a method of controlling the same.

Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus includes an information processing apparatus such as a personal computer (PC), a server or the like for processing general information; an image processing apparatus for processing image data; an audio apparatus for audio process; home appliances for miscellaneous household chores; etc. Various such electronic apparatuses perform their own pre-assigned functions as entities.

As a fundamental structure for operating the electronic apparatus, two aspects of hardware and software are taken together into account. In the aspect of hardware, the electronic apparatus includes an entity for the computing and processing of a process, such as a central processing unit (CPU), a processor or a system on chip (SOC), and a memory into which data for the process is loaded. In the aspect of software, the electronic apparatus includes an operating system or kernel that to perform the basic management of a system, and an application that runs on the operating system and executes the process. For instance, the CPU loads and executes data corresponding to the operating system into the memory such as a random-access memory (RAM), loads the application into the memory while the operating system is running, and executes the application on the operating system, thereby finally performing the process based on the execution of the application.

As the execution and termination of several processes are repeated over time, the used capacity of the memory the data of the process occupies increases but the available capacity of the memory decreases. When the available capacity of the memory decreases below a predetermined threshold, the electronic apparatus performs a memory recovery, e.g., decreases the used capacity of the memory and increases the available capacity of the memory to execute a subsequent process. There are many memory recovery methods. For example, in the case of file-type data, such data is readable again from a flash memory or the like storage, and therefore the memory recovery is performed by disconnecting a virtual address from a physical address of the memory. On the other hand, in the case of data that is difficult to read directly from the storage (for example, data that is referenced and updated by several processes while being loaded in the memory), the memory recovery is performed by disconnecting the virtual address from the physical address of the memory after the data is backed up to a swap device different from the memory. The latter method is called a memory swap, and when there is new access to that virtual address, a restoration operation is performed to restore the swapped data back to the memory.

Meanwhile, the area of the virtual address includes a user area and a kernel area which are isolated from each other, and therefore memory access using the virtual address for the user area in a user mode is also isolated from that in a kernel mode. Even when an interruption occurs during the restoration operation of the memory swap in the user mode, the virtual address (e.g., user area) related to the memory swap is isolated from the virtual address (e.g., kernel area) related to the interruption, and therefore the restoration operation is safe. On the other hand, when an interruption occurs during the restoration operation of the memory swap in the kernel mode, the virtual address related to the interruption is in the same kernel area as the virtual address related to the memory swap. When the virtual address related to the interruption is the same as the virtual address related to the memory swap, a deadlock occurs due to collision between two kernel processes' restoration operations of the memory swap, thereby causing an error.

Accordingly, it would be desirable to provide an electronic apparatus that overcomes the deadlock and enables the memory swap in the kernel mode.

SUMMARY

According to an example embodiment, an electronic apparatus may include: a first memory; a second memory; and a processor configured to: store data of a user process related to a user area assigned to the first memory or a system process related to a system area assigned to the first memory in the second memory, in response to a memory recovery event for the first memory, and allow an area of the first memory corresponding to at least one of the user area or the system area to store other data; restore the data stored in the second memory to the first memory, in response to a data restoration event based on an access of a first process to the data stored in the second memory; and perform one of restoration of the data based on the access of the first process and restoration of the data based on an access of the second process and prevent, at least temporarily, the other one from being performed, in response to identification of the access of the second process during the access of the first process to the data stored in the second memory through the system area.

Further, the processor may compare the first process and the second process with respect to priority, and execute one of the first process and the second process having a relatively high priority.

Further, the system area may include a virtual address provided to be assigned to a physical address of the first memory, and the processor may prevent, at least temporarily, the data from being restored based on the virtual address set to be connected to a physical address of the restored data, and restore the data based on the virtual address not set to be connected to a physical address of the restored data.

Further, the processor may decompress compressed and stored data in the second memory and restore the decompressed data to the first memory.

Further, the processor may put an operation based on the access of the second process on standby, in response to the identification of the access of the second process before completing an operation of storing data of the first process in the second memory during the memory recovery event.

Further, the system area may include a plurality of virtual addresses provided to be assigned to physical addresses of the first memory, and the processor may select data corresponding to a virtual address having a relatively low access count among the plurality of virtual addresses and store the selected data in the second memory during the memory recovery event.

Further, the processor may increase the access count for the virtual address based on time between a point of storing data corresponding to the virtual address in the second memory and a point of restoring the data to the first memory, the time being shorter than or equal to a threshold, and decrease the access count based on the time longer than the threshold.

Further, the processor may increase the access count for the virtual address based on occurrence of multiple accesses to the virtual address.

Further, the system area may include a virtual address provided to be assigned to a physical address of the first memory, and the processor may prevent, at least temporarily, data of the physical address from being stored in the second memory, based on identification of a direct hardware access of the electronic apparatus to the physical address without using the virtual address during the memory recovery event.

Further, the processor may compress data of the first memory and store the compressed data in the second memory.

Further, the processor may identify occurrence of the memory recovery event based on an available capacity of the first memory decreasing below a threshold.

Further, the system area may include a virtual address provided to be assigned to a physical address of the first memory, and the processor may identify occurrence of the memory recovery event based on an access to the virtual address disconnected from the physical address.

Further, according to an example embodiment, a method of controlling an electronic apparatus may include: storing data of a user process related to a user area assigned to a first memory or a system process related to a system area assigned to the first memory in a second memory, in response to a memory recovery event for the first memory, and allow an area of the first memory corresponding to at least one of the user area or the system area to store other data; restoring the data stored in the second memory to the first memory, in response to a data restoration event based on an access of a first process to the data stored in the second memory; and performing one of restoration of the data based on the access of the first process and restoration of the data based on an access of the second process and preventing, at least temporarily, the other one from being performed, in response to identification of the access of the second process during the access of the first process to the data stored in the second memory through the system area.

BRIEF DESCRIPTION OF DRAWINGS

The above and other aspects, features and advantages of certain embodiments of the present disclosure will be more apparent from the following detailed description, taken in conjunction with the accompanying drawings, in which:

FIGS. 8 and 9 are flowcharts showing an example procedure in which an electronic apparatus performs swap-in.

DETAILED DESCRIPTION

Below, certain example embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present concept by a person having an ordinary skill in the art.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
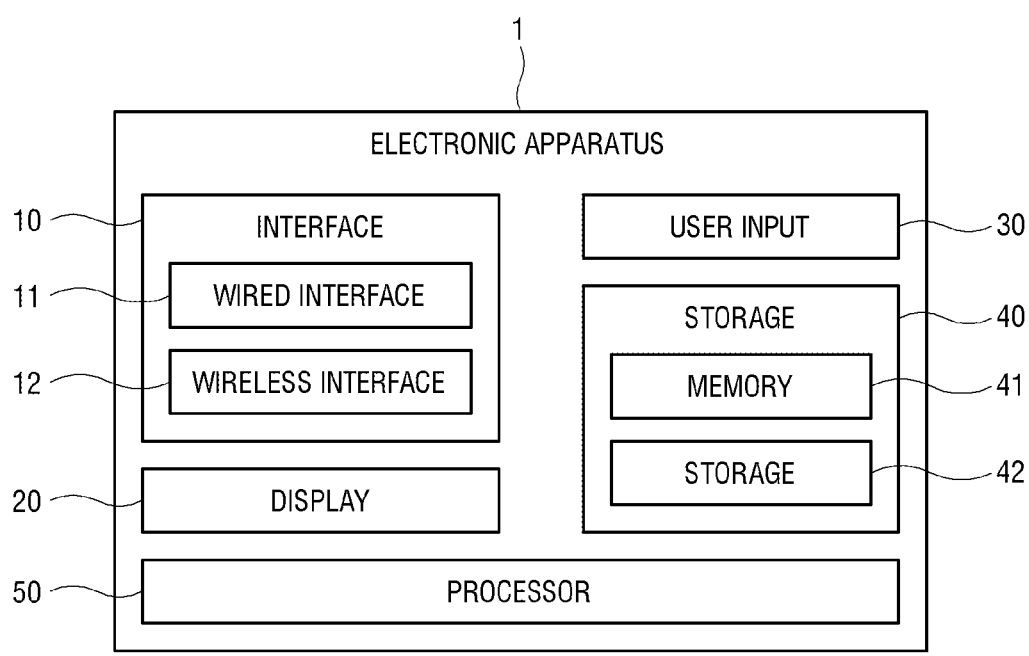
FIG. 1 is a block diagram of an example electronic apparatus.

FIG. 1 is a block diagram of an electronic apparatus.

As shown in FIG. 1, this embodiment relates to an electronic apparatus 1. The electronic apparatus 1 may be embodied by various kinds of apparatuses, for example, a personal computer (PC), a server or the like information processing apparatus; a television (TV), a monitor, a digital signage, an electronic blackboard, an electronic frame, or the like stationary display apparatus; a smartphone, a tablet device, a portable multimedia player or the like mobile device; a set-top box, an optical media player or the like image processing apparatus; a refrigerator, a washing machine, a clothing manager, an air conditioner or the like home appliances; a gateway for establishing the Internet of things (IOT) environment; a hub; a host apparatus; a slave apparatus; or a wearable device for a human.

The electronic apparatus 1 include various hardware elements for operations. In this embodiment, it will be described that the electronic apparatus 1 is implemented as a display apparatus. However, as described above, the electronic apparatus 1 may be implemented by various kinds of apparatuses, and the following configurations are merely one of various examples.

The electronic apparatus 1 may include an interface 10. The interface 10 includes an interface circuit through which the electronic apparatus 1 performs communication with various types of external apparatuses and transmits and receives data. The interface 10 may include at least one of one or more wired interfaces 11 for wired communication, or one or more wireless interface 12 for wireless communication according to connection types.

The wired interface 11 includes a connector or port to which a cable of previously defined transmission standards is connected. For example, the wired interface 11 includes a port connecting with a terrestrial or satellite antenna to receive a broadcast signal or connecting with a cable for cable broadcasting. Further, the wired interface 11 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 11, including interface circuitry, includes a port of universal serial bus (USB) standards to connect with a USB device. Further, the wired interface 11 includes an optical port to which an optical cable is connected. Further, the wired interface 11 includes an audio input port to which an external microphone is connected, and an audio output port to which a headset, an earphone, a loudspeaker etc. is connected. Further, the wired interface 11 includes an Ethernet port connected to a gateway, a router, a hub, etc. For connection with the WAN.

The wireless interface 12 includes an interactive communication circuit/circuitry including at least one of elements such as a communication module comprising communication circuitry, a communication chip, etc. corresponding to various kinds of wireless communication protocols. For example, the wireless interface 12 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 1 may include the display 20. The display 20 forms a screen for displaying an image based on an image signal processed by the processor 270 (which of course comprises processing circuitry). The display 20 includes a display panel, and the display panel may be designed to have various structures. For example, the display 20 may include a display panel having a light-receiving structure like liquid crystal, and a backlight unit illuminating the display panel. Alternatively, the display 20 may include a display panel having a self-emissive structure like an organic light emitting diode (OLED). Alternatively, the display 20 may have a structure where a plurality of micro light emitting diode (LED) modules are combined in the form of tiles to form a large screen.

The electronic apparatus 1 may include a user input 30. The user input 30 includes a circuit related to various kinds of user input interfaces to be controlled by a user to thereby receive a user input. The user input 30 may be variously configured according to the kinds of electronic apparatus 1, and may for example include a mechanical or electronic button of the electronic apparatus 1; various kinds of sensors; a touch pad; a touch screen installed in the display 20; an external input device, such as a keyboard, a mouse and a remote controller, separated from the electronic apparatus 1 and connected through the interface 10; etc.

The electronic apparatus 1 may include a storing unit 40. The storing unit 40 is configured to store digitalized data. The storing unit 40 includes one or more volatile memories 41 in which data to be processed by a processor 50 is loaded and data is retained only when power is supplied, and one or more involatile storages 42 in which data is retained regardless of whether power is supplied or not. The memory 41 includes a buffer, a RAM, etc., and the storage 42 includes a flash memory, a hard disc drive (HDD), a solid-state drive (SSD), a read only memory (ROM), etc.

The storing unit 40 stores an operating system for basic operations of the electronic apparatus 1, and several applications executed on the operating system and corresponding to various functions. When power is not supplied to the electronic apparatus 1, the operating system and the applications are being stored in the storage 42. As the electronic apparatus boots up, the operating system is loaded into the memory 41 and run, and the applications are loaded into the memory 41 and executed in response to various events.

The electronic apparatus 1 may include the processor 50 (which of course comprises processing circuitry). The processor 50 includes one or more hardware processors achieved by a central processing unit (CPU), a chipset, a buffer, a circuit, etc. which are mounted on a printed circuit board (PCB). Alternatively, the processor 170 may be designed as a system on chip (SoC). When the electronic apparatus 1 is a display apparatus, the processor 50 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC.

The processor 50 performs booting when system power is supplied, and makes the operating system stored in the storage 42 be loaded into the memory 41 and run. The processor 50 loads the application stored in the storage 42 into the memory 41 and executes the loaded application on the operating system in response to various user inputs occurring while the operating system is running or an event based on process execution. However, the processor 50 does not directly access the memory 41, but accesses the memory 41 by setting a virtual memory area. Below, a method of accessing the memory 41 by the processor 50 will be described. In this embodiment, it will be described that the operating system is based on the Linux. However, the kind of operating system is not limited to the Linux.

Figure 2:
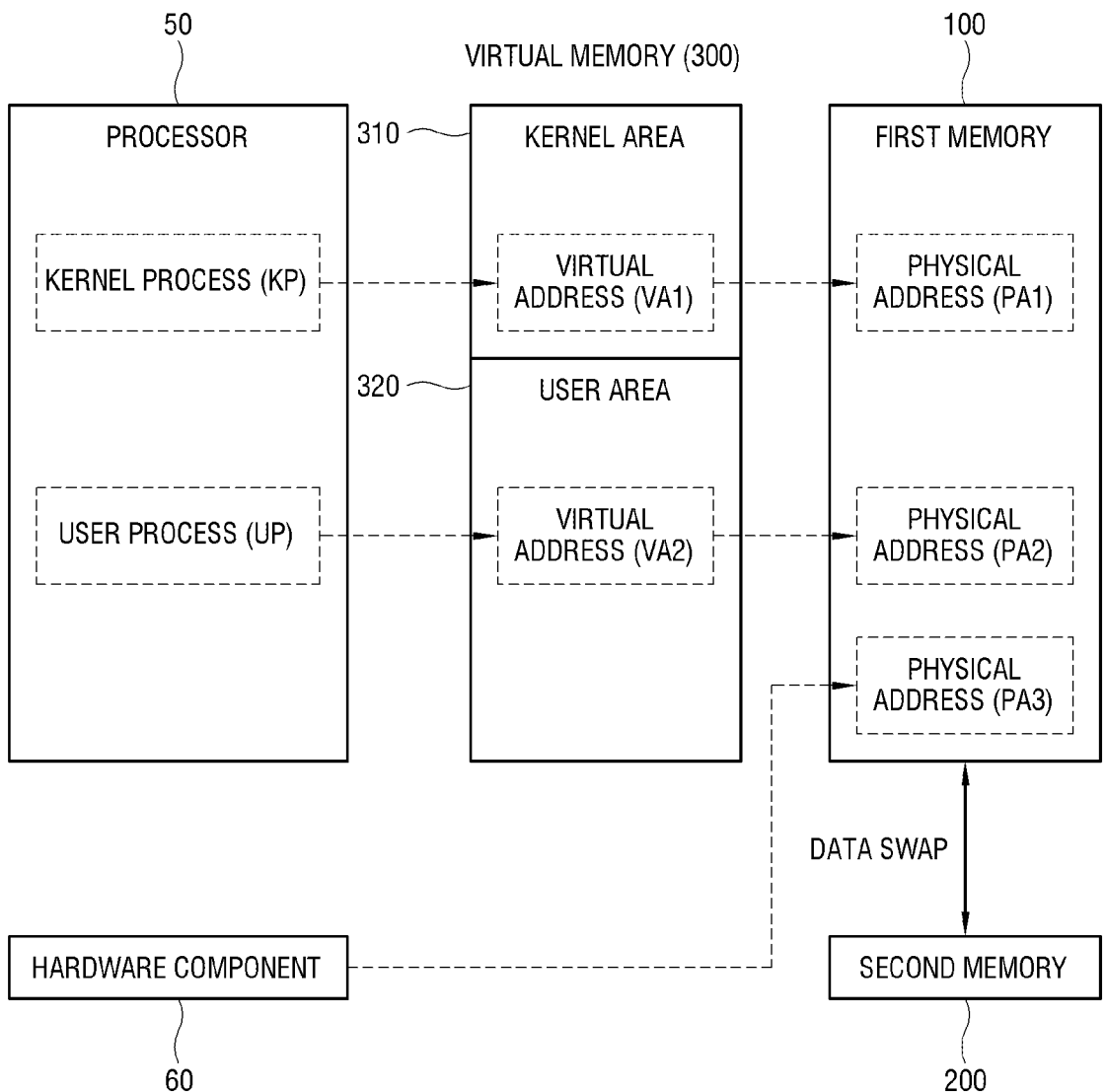
FIG. 2 illustrates an example method by which a process executed by a processor accesses a memory.

FIG. 2 illustrates a method by which a process executed by a processor accesses a memory.

As shown in FIGS. 1 and 2, various processes such as a kernel process (KP) and a user process (UP) executed by the CPU or the processor 50 do not directly access the addresses PA1 and PA2 of a first memory 100 into which data is loaded, but accesses the first memory 100 via a virtual memory space or a virtual memory 300. Here, the first memory 100 may be called a physical memory on the contrary to the virtual memory 300, and implemented as the RAM among the memories 41 of the storing unit 40. Further, for distinction, the addresses of the first memory 100 may be referred to as physical addresses PA1, PA2 and PA3, and the addresses of the virtual memory 300 may be referred to as virtual addresses VA1 and VA2.

The virtual memory 300 refers to an area, in which the virtual addresses VA1 and VA2 mapped (connected or assigned) are recorded respectively corresponding to the physical addresses PA1 and PA2 of the first memory 100, and may use various storage areas provided by the storing unit 40. The virtual memory 300 may be divided into a kernel area 310 and a user area 320. The system area or kernel area 310 includes the virtual addresses VA1 and VA2 accessed by the kernel process KP performed by the operating system, in other words, the kernel. On the other hand, the user area 320 includes the virtual addresses VA1 and VA2 accessed by the user process UP performed by not the operating system but the application. Basically, the virtual addresses VA1 and VA2 of the virtual memory 300 are respectively connected to the physical addresses PA1 and PA2 of the first memory 100, and the processes KP and UP can access the physical addresses PA1 and PA2 via the virtual addresses VA1 and VA2.

Meanwhile, there is a direct memory access (DMA) through which a process performed by not the processor 50 but a separate hardware component 60 directly accesses the physical address PA3 of the first memory 100 without using the virtual memory 300. Because the processor 50 causes load and delay in system resources, a graphic processing unit (GPU) or the like hardware component 60 may use the DMA when a fast-processing speed is required.

However, the connection between the virtual addresses VA1 and VA2 and the physical addresses PA1 and PA2 is not permanent, and the connection may be disconnected or adjusted based on various events. For example, when data is deleted from the first memory 100, the physical addresses PA1 and PA2 where the data was located are disconnected from the virtual addresses VA1 and VA2. In this case, new data may be recorded in those physical addresses PA1 and PA2. Alternatively, when a memory swap occurs, the connection between the virtual addresses VA1 and VA2 and the physical addresses PA1 and PA2 may be adjusted depending on swap states. Below, the memory swap will be described.

When a memory recovery event occurs, the electronic apparatus 1 performs a memory recovery operation to secure the available capacity of the first memory 100. The memory recovery event occurs when the available capacity of the first memory 100 decreases below a threshold. As one of the memory recovery operations, there is the memory swap, which is performed as follows.

When detecting the memory recovery event, the electronic apparatus 1 identifies a swapping target from among the virtual addresses VA1 and VA2 of the virtual memory 300. When the swapping target, e.g., the virtual address VA1 or VA2 is identified, the electronic apparatus 1 disconnects mapping between the identified virtual address VA1 or VA2 and the physical address PA1, PA2 or PA3, transfers data from the corresponding physical address PA1, PA2 or PA3 to a predetermined swapping location of a swap memory or second memory 200, and records the address of the swapping location, e.g., a swap address. These operations are called swap-out. Therefore, the corresponding physical address PA1, PA2 or PA3 may be allowed to store other data via another virtual address. The swapped-out virtual address VA1 or VA2 may be in a state of not being mapped to the physical address PA1, PA2 or PA3. The second memory 200 may include any storage means different from the first memory 100 among storage means provided by the storing unit 40 regardless of whether it has volatile or nonvolatile properties. For example, when the electronic apparatus 1 is a server, a PC or the like, the nonvolatile storage 42 such as an HDD and an SSD may generally be used as the second memory 200. When the electronic apparatus 1 is a TV, a mobile device or the like embedded system, a RAMDisk-based second memory 200 may be used for example.

A predetermined process KP and/or UP may access the swapped-out virtual address VA1 and/or VA2. In this case, the corresponding virtual address VA1 or VA2 is disconnected from the physical address PA1, PA2 or PA3, and therefore a page fault occurs. A page may refer to a basic unit for managing the first memory 100, and the first memory 100 may be managed in units of 4 KB under a 32-bit operating system. The page fault is an error that occurs when no physical addresses PA1, PA2 and PA3 are mapped to the virtual address VA1 or VA2 accessed by the process KP or UP. In response to the page fault, the electronic apparatus 1 acquires the swap address of the second memory 200 corresponding to that virtual address VA1 or VA2 (e.g., the address of the second memory 200 at which the swapped-out data of the virtual address VA1 or VA2 is stored), and restores the data stored at the swap address to the first memory 100. In this case, a new physical address of the data restored to the first memory 100 may be different from the physical address before the swap-out, and therefore the electronic apparatus 1 connects the virtual address VA1 or VA2 again to the new physical address. The above procedure will be called swap-in.

The swapping operation for the virtual address VA2 of the user area 320 is different in details, e.g., interruption-related cases from the swapping operation for the virtual address VA1 of the kernel area 310. The interruption indicates a case that an exception occurs due to various causes such as input/output hardware while a program is running by the processor 50 and thus a notification of the exception is transmitted to the processor 50. When an interruption is detected, the processor 50s stops the execution of the machine code being currently in progress, and executes a program or code for processing the interruption, thereby performing the processing for the interruption. When the processing for the interruption is completed, the processor 50 resumes the stopped execution of the machine code.

When an interruption occurs while the swap-in is performed for the virtual address VA2 of the user area 320, the electronic apparatus 1 stops the swap-in and processes the interruption. Because the interruption corresponds to the kernel process KP, the interruption does not access the swapped-in virtual address VA2. On the other hand, it will be considered that the page fault occurs at the virtual address VA1 of the kernel area 310 and the interruption occurs before the swap-in is completed. In this case, a plurality of processes KP have overlapping accesses to the virtual address VA1 unlike those in the user area 320, thereby causing overlapping swap-in operations. Below, the operations of the electronic apparatus 1 for solving such overlap will be described.

Figure 3:
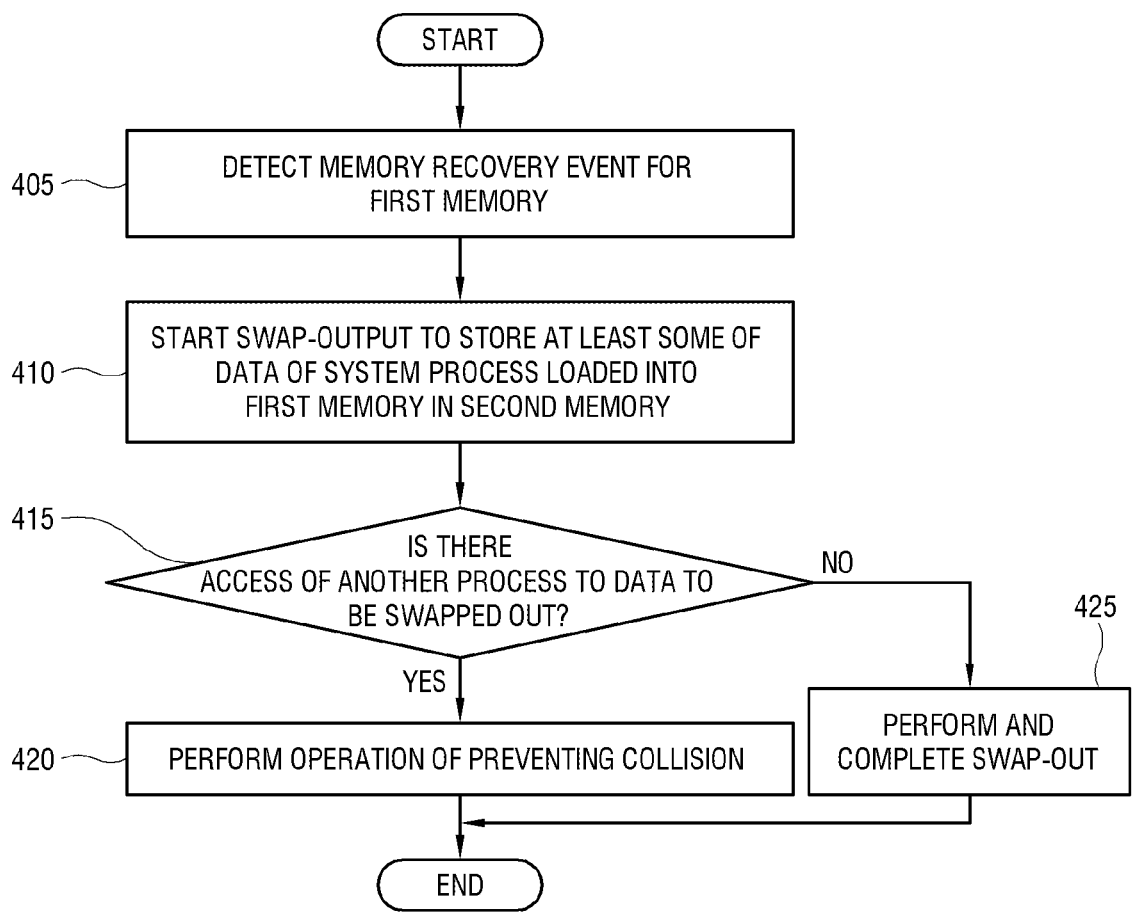
FIGS. 3 and 4 are flowcharts showing a control method of an example electronic apparatus.
Figure 4:
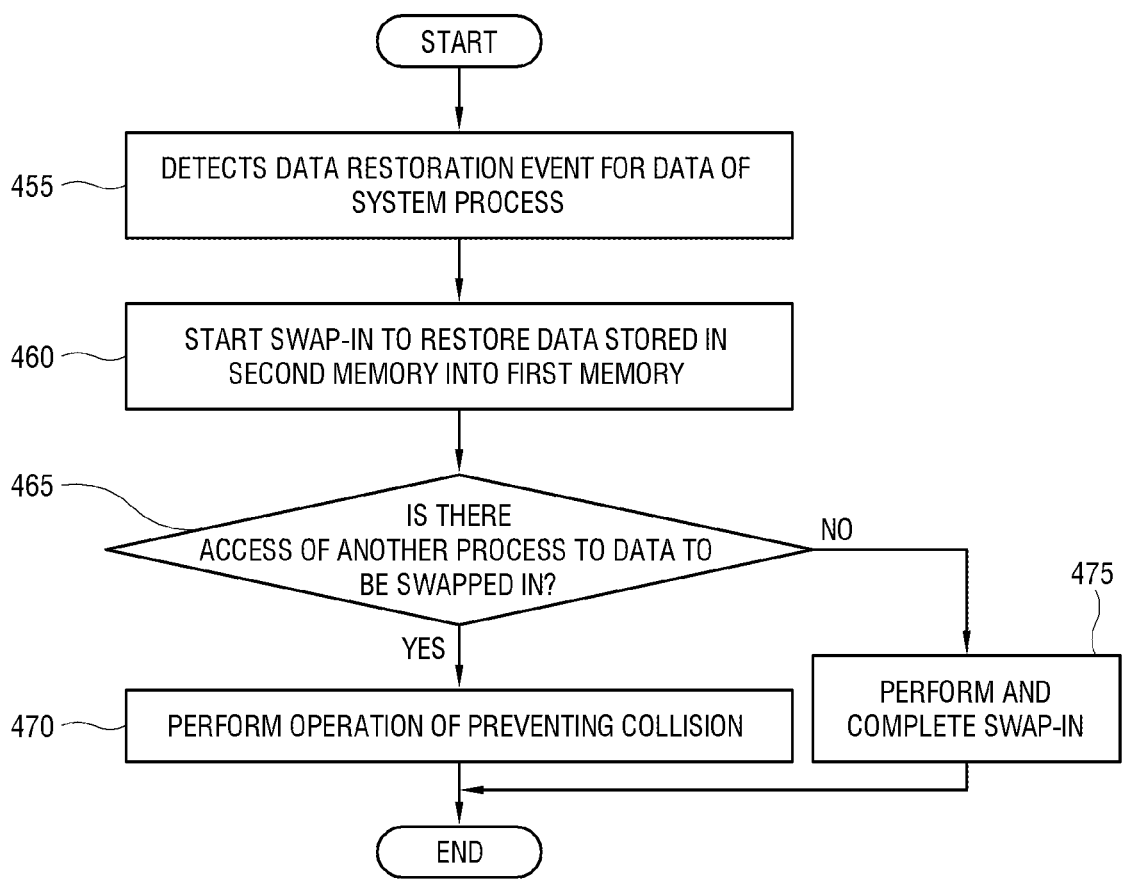

FIGS. 3 and 4 are flowcharts showing a control method of an electronic apparatus.

As shown in FIGS. 2, 3 and 4, the following operations are performed by the processor 50 of the electronic apparatus 1 or an additional hardware controller provided in the electronic apparatus 1.

At operation 405 the electronic apparatus 1 detects a memory recovery event for the first memory 100. For example, the memory recovery event may correspond to a case where the available capacity of the first memory 100 decreases below the threshold.

At operation 410 the electronic apparatus 1 starts the swap-output to store at least some of data of the system process (e.g., the kernel process) loaded into the first memory 100 in the second memory 200. In this case, the address of the data that was loaded into the first memory 100 is allowed to record other data, and therefore the first memory 100 is increased in available capacity for loading other data.

At operation 415 the electronic apparatus 1 identifies whether there is an access of another process to the data to be swapped out, before the swap-out is completed.

When it is identified that there is an access of another process to the data to be swapped out ("YES" in the operation 415), at operation 420 the electronic apparatus 1 performs an operation of preventing or reducing likelihood of collision with the access of another process. On the other hand, when it is identified that there is no access of another process to the data to be swapped out ("NO" in the operation 415), at operation 425 the electronic apparatus 1 perform and complete the swap-out.

Meanwhile, at operation 455 the electronic apparatus 1 detects a data restoration event. For example, the data restoration event corresponds to a page fault due to an access of a predetermined first process to the data of the system process stored in the second memory 200 in the procedure of FIG. 3.

At operation 460 the electronic apparatus 1 starts the swap-in to restore and load the data stored in the second memory 200 into the first memory 100.

At operation 465 the electronic apparatus 1 identifies whether there is an access of the second process to the data to be swapped in before the swap-in is completed.

When it is identified that there is an access of the second process to the data to be swapped in ("YES" in the operation 465), at operation 470 the electronic apparatus 1 performs an operation of preventing or reducing chance of collision between the data restoration operation due to the access of the first process and the data restoration operation due to the access of the second process. On the other hand, when it is identified that there is no access of another process to the data to be swapped in ("NO" in the operation 465), at operation 475 the electronic apparatus 1 perform and complete the swap-in.

In this way, the electronic apparatus 1 stores the data of the user process related to the user area 320 mapped to the first memory 100 or the data of the system process related to the system area 310 mapped to the first memory 100 in the second memory 200 in response to the memory recovery event, thereby allowing the area of the first memory 100 corresponding to at least one of the user area 320 or the system area 310 to store other data. Further, the electronic apparatus 1 restores the data of the user process or system process stored in the second memory 200 to the first memory 100 in response to the data restoration event. The electronic apparatus 1 performs an operation of preventing collision or reducing chance of with an identified access of another process, in response to that the access of that process to the area of the first memory 100 via the system area 310 may be identified during the memory recovery event or the data restoration event.

Thus, the electronic apparatus 1 performs the predefined operation of preventing or reducing chance of collision with an access of another process when that process accesses to data related to the kernel process while that data is swapped out or in, thereby preventing or reducing chance of a deadlock.

The collision-preventing operation 420 of FIG. 3 and the collision-preventing operation 470 of FIG. 4 may be designed by various methods, details of which will be described in the following embodiment.

Figure 5:
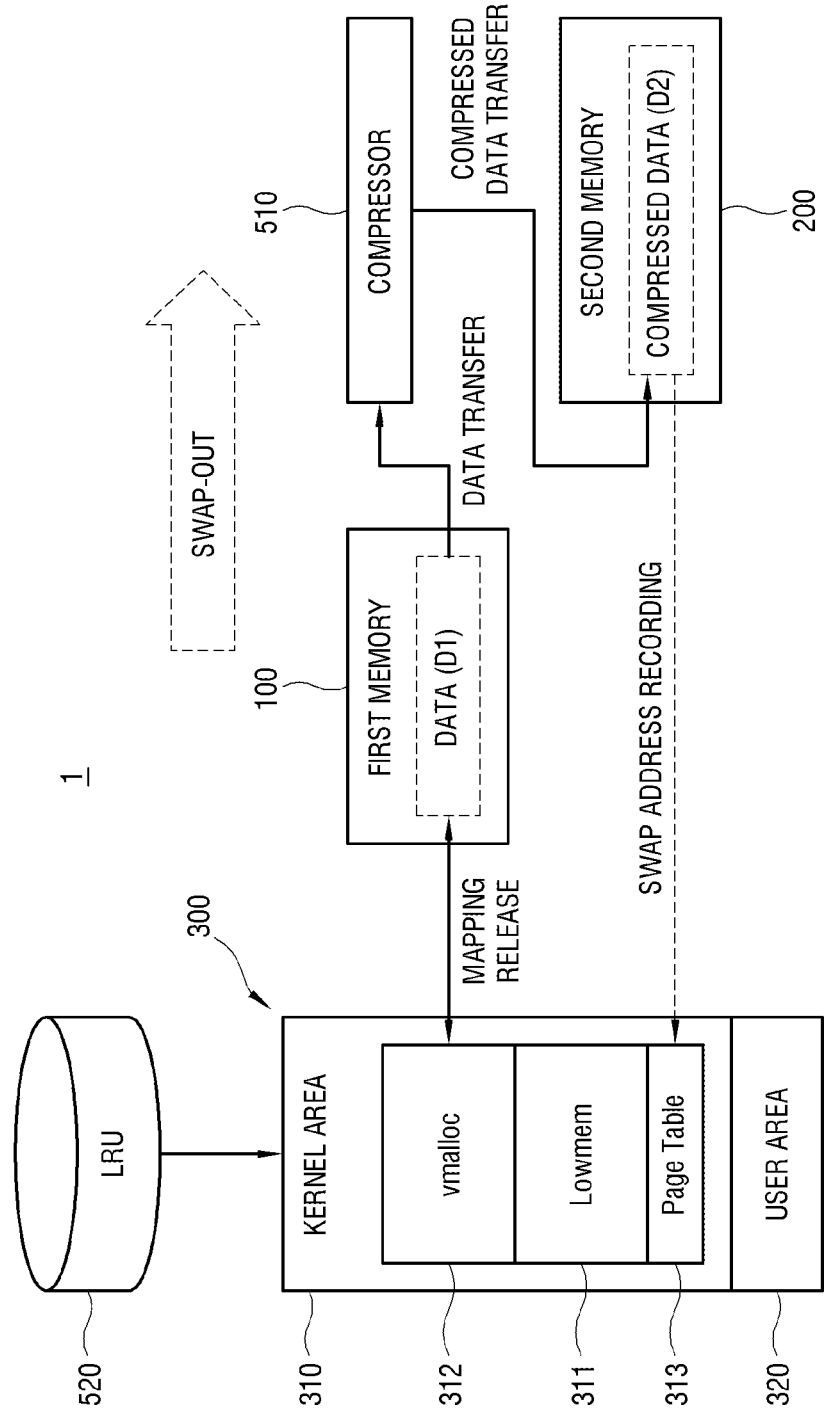
FIG. 5 is a block diagram showing an example swap-out procedure for data of a kernel process.

FIG. 5 is a block diagram showing a swap-out procedure for data of the kernel process.

As shown in FIG. 5, the kernel area 310 in the virtual memory 300 of the electronic apparatus 1 refers to an area in which a virtual address corresponding to a physical address is recorded when data for the kernel process's access is stored at that physical address of the first memory 100. The kernel area 310 may be divided into several areas according to functions. A Lowmem 311 refers to an area where the virtual addresses and the physical addresses are connected by one-to-one linear correspondence. The virtual addresses of the Lowmem 311 are mapped to the physical addresses when the electronic apparatus 1 boots, and are not changed in the mapped physical addresses until the electronic apparatus 1 is powered off. A Highmem or vmalloc 312 refers to an area where consecutive virtual addresses are connected corresponding to inconsecutive physical addresses. For the stable operations of the kernel, a memory swapping target may include the vmalloc 312 except the Lowmem 311. However, the Lowmem 311 may also be designed as the memory swapping target. A Page Table 313 refers to an area where the swap address is recorded. The swap address refers to an address of a swapping location where data D2 is swapped out from the first memory 100 and stored in the second memory 200.

The first memory 100 is typically managed in units of nodes or physical nodes, for example. Separately from such physical nodes, the virtual nodes may be assigned to the storage area in which data to be swapped in the first memory 100 is loaded. In other words, the electronic apparatus 1 may assign and manage the virtual nodes to the first memory 100 so as to correspond to the kernel area 310 in which the swap is possible, thereby identifying the data to be swapped.

As the memory recovery event occurs, the electronic apparatus 1 identifies data D1 to be swapped and the virtual address of the data D1 among the data of the kernel process (e.g., the data located at the physical address of the first memory 100 corresponding to the virtual address of the kernel area 310). The electronic apparatus 1 releases the mapping between the physical address, in which the data D1 identified as the swapping target is stored, and the virtual address. In other words, the electronic apparatus 1 disconnects the virtual address identified in the kernel area 310 from the corresponding physical address. In the first memory 100, the physical address disconnected from the virtual address is allowed to record other data.

The electronic apparatus 1 transmits the data D1 from the first memory 100 to a compressor 510. The compressor 510 includes a software program or hardware chipset to compress the data D1 in a predetermined compression format and reduce the size of data D1. However, such a compressing procedure of the compressor 510 is not essential. Because the compression procedure for the data D1 causes a system load and a time delay, the electronic apparatus 1 may be designed not to include the compressor 510 in consideration of the system resources of the electronic apparatus 1. When the compressor 510 is excluded, the data D1 is directly transferred from the first memory 100 to the second memory 200.

Meanwhile, data D2 compressed by the compressor 510 is transferred to the second memory 200 and stored in the second memory 200. The swap address of the swapping location in the second memory 200 where the compressed data D2 is stored is recorded in the Page Table 313 of the kernel area 310.

Meanwhile, the kernel process may access the virtual address targeted for the swap-out before a swapping-out operation is completed. For example, when the processor is provided as a multi-core CPU, one core may perform the swap-out while another core processes an interruption. In this case, the operation of swapping out the data D1 may collide with the operation of accessing the data D1, and therefore the electronic apparatus 1 puts the accessing operation of the kernel process on standby until the operation of swapping out the data D1 is completed (see the operation 420 in FIG. 3). After the operation of swapping out the data D1 is completed, the swap-in operation for the compressed data D2 is followed because the kernel process needs to access the data D1.

Regarding the recorded virtual address of the kernel area 310, data not to be swapped may be variously designated by design methods. For example, information about the Page Table 313, information involved in compression or decompression used when the data D1 is swapped, etc. are excluded. When such information is designated as the swapping target, a recursive call may occur during the swapping operation, thereby causing an infinite loop. In the case of the electronic apparatus 1 having the 32-bit system, the Lowmem 311 has the physical addresses fixedly mapped to the virtual addresses by one-to-one correspondence, and therefore a problem may occur in the stability of the system when the Lowmem 311 is designated as the swapping target. Therefore, the Lowmem 311 may be excluded from the swap target in the electronic apparatus 1 having the 32-bit system. However, in the case of the electronic apparatus 1 having a 64-bit or higher system, the range of the virtual memory expressible by a 64-bit kernel is so large that the Lowmem 311 can be also designated as the swapping target.

Further, the virtual addresses, which are identified (or marked) as corresponding to the physical addresses directly accessed by not the current processor 50 (see FIG. 1) but another hardware component 60 (see FIG. 2), among the virtual addresses of the kernel area 310, are also excluded from the swapping target. This relates to the DMA, details of which will be described later.

Meanwhile, in relation to the virtual addresses of the kernel area 310, the swapping priority of the data designated as the swapping target may be set by various methods. As one example, the electronic apparatus 1 may use an algorithm of least recently used (LRU) 520. The LRU 520 may have various formats such as a list, a table, a database (DB), and other mathematical algorithms. The LRU 520 has a structure for finding data that has not been used for the longest time, and is based on inference that the data that has not been used for the longest time is less likely to be used in the future. In this case, the electronic apparatus 1 identifies the priority in units of virtual addresses the priority. For example, the electronic apparatus 1 identifies a virtual address of which the latest use (e.g., the latest access by the process) is relatively old, and identifies that the data of that virtual address has a high priority. When a process accesses a predetermined virtual address, the electronic apparatus 1 records an accessing history of the process to that virtual address, thereby updating the LRU 520.

In this way, the electronic apparatus 1 assigns the priority of the swapping target to the virtual address based on an accessing frequency of the process, in response to the memory recovery event. The electronic apparatus 1 assigns a high priority of the swapping target to the virtual address that has been accessed by the process with relatively low frequency, and assigns a low priority of the swapping target to the virtual address that has been accessed by the process with relatively high frequency.

Below, the procedure of the swap-out will be described.

Figure 6:
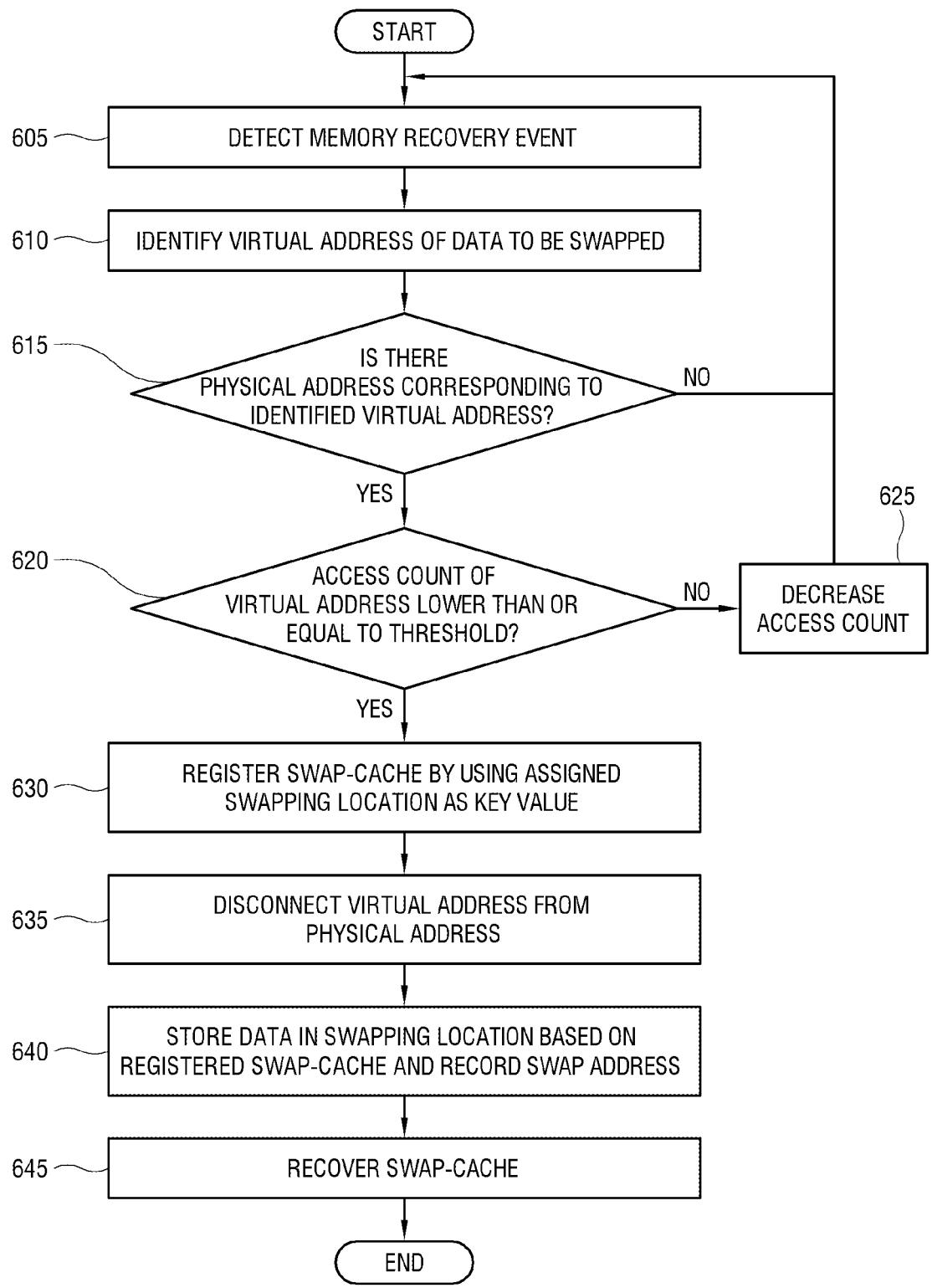
FIG. 6 is a flowchart showing an example procedure in which an electronic apparatus performs swap-out.

FIG. 6 is a flowchart showing a procedure in which an electronic apparatus performs swap-out.

As shown in FIGS. 2 and 6, the following operations may be performed by the processor 50 of the electronic apparatus 1 or an additional hardware controller provided in the electronic apparatus 1.

At operation 605 the electronic apparatus 1 detects a memory recovery event.

At operation 610 the electronic apparatus 1 identifies the virtual address of data to be swapped, e.g., a swapping target.

At operation 615 the electronic apparatus 1 identifies whether there is a physical address corresponding to the identified virtual address. When there is no physical address corresponding to the identified virtual address ("NO" in the operation 615), it indicates that that virtual address has already been swapped out, and therefore the electronic apparatus 1 moves to the operation 610 and performs the identification for another virtual address.

When there is a physical address corresponding to the identified virtual address ("YES" in the operation 615), at operation 620 the electronic apparatus 1 identifies whether an access count of the identified virtual address is lower than or equal to a threshold. The access count refers to the access count of the process to the virtual address, and a low access count indicates that the virtual address is less likely to be accessed by the process.

When the access count is not lower than or equal to the threshold ("NO" in the operation 620), at operation 625 the electronic apparatus 1 decreases the access count of the corresponding virtual address and returns back to the operation 610.

On the other hand, when the access count is lower than or equal to the threshold ("YES" in the operation 620), at operation 630 the electronic apparatus 1 is assigned the swapping location of the second memory 200 and registers a swap cache by using the assigned swapping location as a key value. The details of the swap-cache will be described later.

At operation 635 the electronic apparatus 1 disconnects the virtual address from the physical address.

At operation 640 the electronic apparatus 1 stores the data of the first memory 100 in the swapping location of the second memory 200 based on the registered swap-cache, and records the swap address.

At operation 645 the electronic apparatus 1 recovers (or releases) the swap-cache.

In this way, the electronic apparatus 1 performs the swap-out of the data.

Below, the swap-cache will be described. The swap-cache represents the assigned area of the first memory 100 being recovered or restored, with respect to the swapping location of the second memory 200. While the swap-out or the swap-in is performed, the electronic apparatus 1 stores the swapping operation by assigning a predetermined area of the first memory 100 for the virtual address identified as the swapping target, and registers the assigned area as the swap-cache. The swap-cache is used to prevent or reduce chance of a race condition that may occur when a certain process accesses a page (e.g., data) being swapped out or in.

The race condition refers to that two or more processes concurrently use common resources to perform a reading or writing operation but their operation results are varied depending on the order of accessing common data. In brief, the race condition refers to a condition of contention, in other words, a condition in which two threads are contending for one resource. The swap-cache is used in maintaining synchronization between recovery and restoration when a page being recovered is immediately required to be restored.

After the recovery, the page being shared between several processes may be referenced by only a specific process and remain swapped for the other processes. Thereafter, when one of the other processes accesses the swapped page, the electronic apparatus 1 restores not the second memory 200 but the swap-cache to the first memory 100, thereby maintaining the sharing relationship with the existing processes.

Below, swap-in operations will be described.

Figure 7:
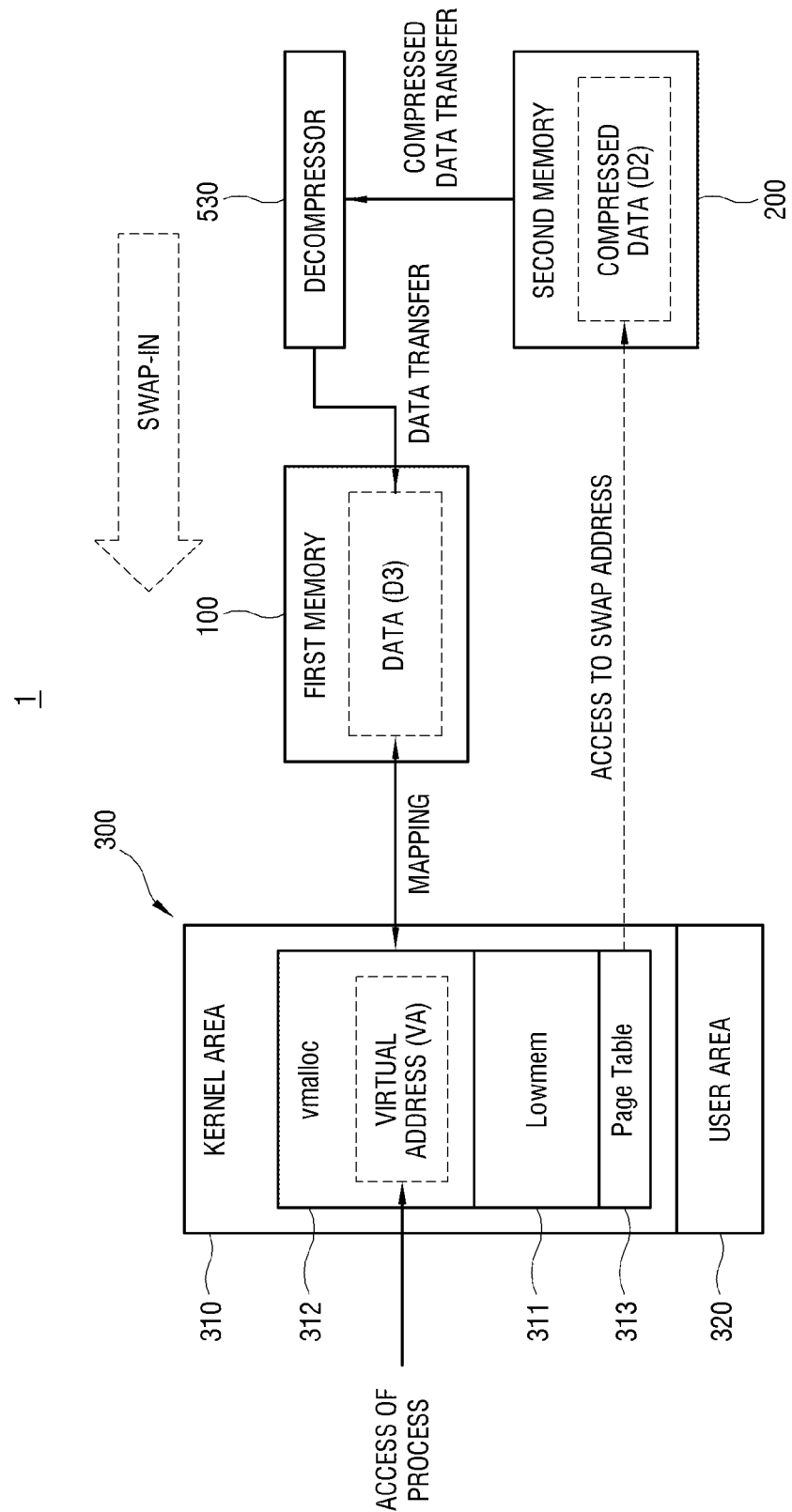
FIG. 7 is a block diagram showing an example swap-in procedure for swapped-out data of a kernel process.

FIG. 7 is a block diagram showing a swap-in procedure for swapped-out data of a kernel process.

As shown in FIG. 7, a predetermined kernel process accesses a virtual address VA, which has been disconnected from the physical address of the first memory 100, in the kernel area 310. The electronic apparatus 1 searches the Page Table 313 for the swap address of the second memory 200 corresponding to the virtual address VA to be accessed. The found swap address represents the swapping location of the swapped-out data D2 in the second memory 200 with respect to the virtual address VA. When the swap address is not found, it is identified that the virtual address VA is neither connected to the physical address nor swapped out, the electronic apparatus 1 performs a separate designated processing operation.

The electronic apparatus 1 obtains compressed data D2 swapped out from the second memory 200 based on the found swap address, and transmits the compressed data D2 to the decompressor 530. The decompressor 530 has the opposite function to the compressor 510 (see FIG. 5), and includes a software program or hardware chipset that decompress the data D2 compressed in a predetermined compression format to return to an original data state as before the compression. The decompressor 530 is not essential in the swapping operation, and the electronic apparatus 1 may not include the decompressor 530 when the compression is not used.

The electronic apparatus 1 loads data D3 decompressed by the decompressor 530 into the first memory 100. In this case, the physical address of the data D3 in the first memory 100 is assigned in the available capacity of the first memory 100 at a swap-in point in time. Therefore, the physical address of the data D3 may be the same as or different from the physical address of the data D1 (see FIG. 5) of the swap-out point in time.

The electronic apparatus 1 maps the virtual address VA and the physical address of the data D3, thereby completing the swap-in operations.

Below, the procedure of the swap-in will be described.

Figure 8:
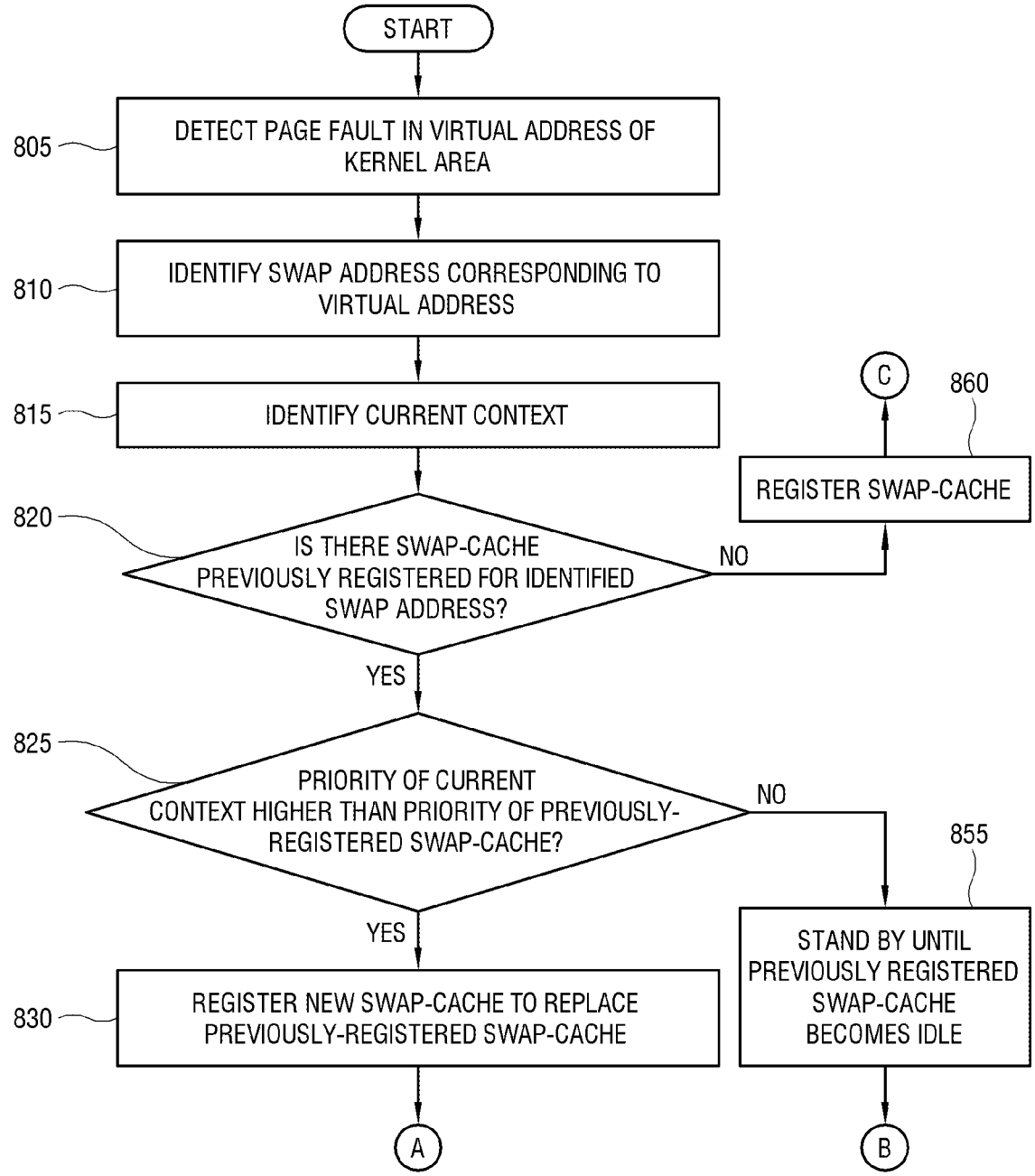
Figure 9:
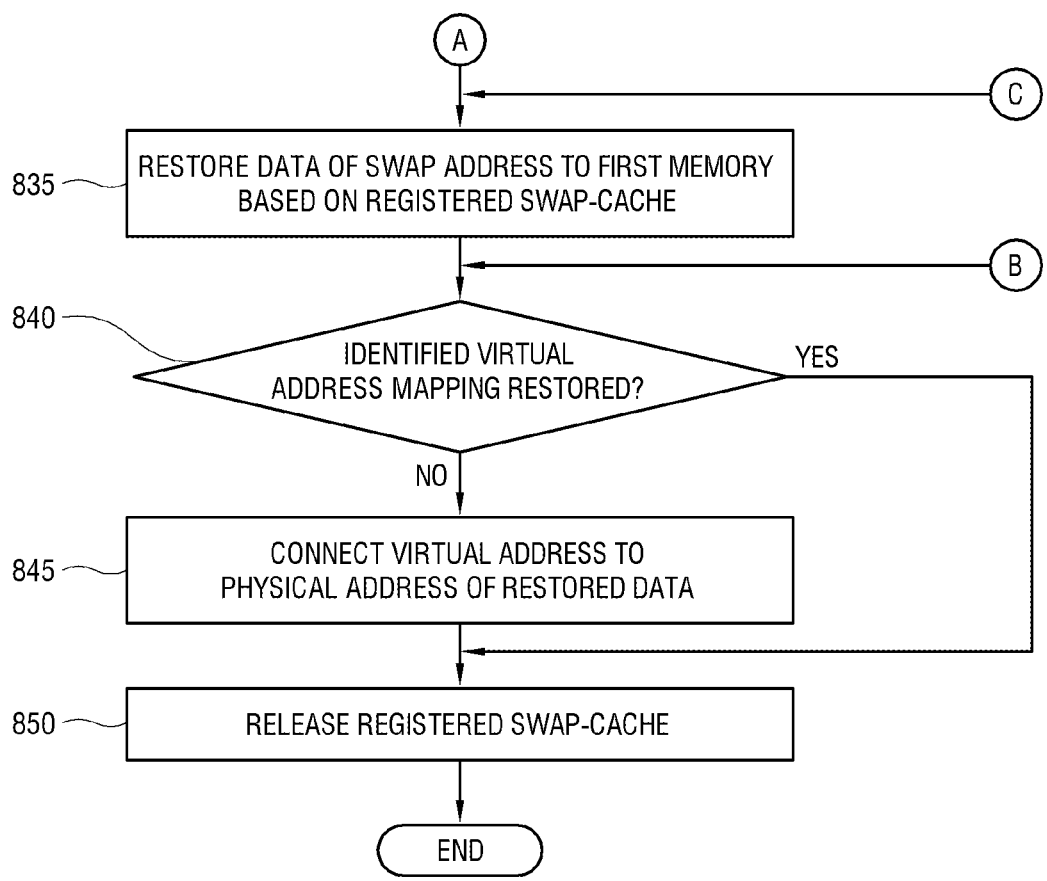

FIGS. 8 and 9 are flowcharts showing a procedure in which an electronic apparatus performs the swap-in.

As shown in FIGS. 2, 8 and 9, the following operations may be performed by the processor 50 of the electronic apparatus 1 or an additional hardware controller provided in the electronic apparatus 1.

At operation 805 the electronic apparatus 1 detects a page fault in the virtual address of the kernel area. The page fault occurs when a process accesses the virtual address disconnected from the physical address. Here, when it is identified that the page fault occurs in the user area, the electronic apparatus 1 performs the swap-in operation for the user area. Further, the electronic apparatus 1 executes a fix-up code when the fix-up code for the corresponding virtual address has been registered even though the page fault occurs in the kernel area.

At operation 810 the electronic apparatus 1 identifies the swap address corresponding to the virtual address in which the page fault occurs.

At operation 815 the electronic apparatus 1 identifies a current running flow, e.g., a current context. The context schematically represents a state where the process or task is running in the electronic apparatus 1. The details of the context will be described later.

At operation 820 the electronic apparatus 1 identifies whether there has already been a swap-cache previously registered for the identified swap address.

When there has already been registered the swap-cache for the identified swap address ("YES" in the operation 820), at operation 825 the electronic apparatus 1 identifies whether the priority of the current context is higher than the priority of the context of the previously-registered swap-cache. Comparison in priority between the contexts will be described later.

When it is identified that the priority of the current context is higher than the priority of the context of the previously registered swap-cache ("YES" in the operation 825), at operation 830 the electronic apparatus 1 registers a new swap-cache to replace the previously-registered swap-cache. In other words, when the new swap-cache in the operation 830 is a first swap-cache and the previously registered swap-cache identified in the operation 820 is a second swap-cache, the electronic apparatus 1 replace the second swap-cache with the first swap-cache, thereby registering the first swap-cache.

At operation 835 the electronic apparatus 1 restores data of the swap address to the first memory 100 based on the registered swap-cache.

At operation 840 the electronic apparatus 1 identifies whether the mapping of the identified virtual address (e.g., the connection of the virtual address to the physical address) is restored.

When the connection of the identified virtual address to the physical address is restored ("YES" in the operation 840), the electronic apparatus 1 moves to operation 850.

On the other hand, when the connection of the identified virtual address to the physical address is not restored ("NO" in the operation 840), at operation 845 the electronic apparatus 1 connects the virtual address to the physical address of the restored data.

Among the foregoing operations, the operations 825, 830, 840, 845 and 855 correspond to the foregoing collision-preventing operation 470 of FIG. 4.

When the swap-in due to the page fault concurrently occurs in several tasks of contexts having various priorities (for example, when a plurality of tasks performs the swap-in for the same virtual address while the cores of a multicore CPU perform the tasks), the swap-caches may be in competition. A rival task may first restore the mapping of the virtual address, and therefore, when it is identified that any one of the tasks first restores the mapping of the virtual address, the electronic apparatus 1 prevents, at least temporarily, the other rival tasks from performing the mapping.

At operation 850 the electronic apparatus 1 releases the registered swap-cache.

On the other hand, when it is identified that the priority of the current context is not higher than the priority of the context of the previously registered swap-cache ("NO" in the operation 825), at operation 855 the electronic apparatus 1 stops this operation and is on standby until the previously registered swap-cache becomes idle (e.g., until the execution is completed), and moves to the operation 840 when the previously registered swap-cache becomes idle.

Meanwhile, when the current context is in an interruption state, the electronic apparatus 1 may additionally mark the virtual address to prevent or reduce the chance of the restored data from being swapped out.

On the other hand, when there has not already been registered the swap-cache for the identified swap address ("NO" in the operation 820), at operation 860 the electronic apparatus 1 registers a new swap-cache and moves to the operation 835.

Below, the context and the priority will be described. The context represents an operation state of a task being in progress at a current point in time. Based on a fault point in time, the context largely includes three states such as a fault during normal execution, a fault during preemption of the CPU (or the processor), and a fault during an interruption. The fault during the normal execution refers to a normal state in which the task preempts the CPU only for a given time and transfers the preemption of the CPU to another task when the given time is over. The fault during the preemption of the CPU refers to a state in which the task does not yield the resources of the CPU to other tasks until its operation is terminated, in other words, the task maintains the CPU preempted without transferring the preemption of the CPU to other tasks during the operation (however, the preemption of the CPU is transferrable in the case of interruption). The fault during the interruption refers to a state in which the task does not yield the resources of the CPU to any other tasks until its operation is terminated (for example, in the case of receiving a timer or hardware input signal). However, there may be some functional differences according to chip architectures. For example, when an interruption is in progress, the task is not deprived of the preemption of the CPU even though another interruption occurs. In addition, the priority may be set among the interruptions, so that the interruption having a higher priority can preempt the CPU.

The contexts have higher priorities in the order of the fault during the interruption, the fault during the preemption of the CPU, and the fault during the normal execution. When there are swap-caches in which a swap-in operation being performed by a fault that occurs during an interruption is overlapped with a swap-in caused by another interruption, the swap-in is performed through one of the swap-caches based on contention between the swap-caches. "Based on" as used herein covered based at least on.

Below, the access count will be described. The access count represents the frequency of accessing a predetermined virtual address. The access count is given with respect to the virtual address, and may be adjusted according to changes in condition, thereby preventing, at least temporarily, data at a specific virtual address from being frequently swapped. The criteria for the access count may be variously designated according to design methods. For example, when difference between a point in time when data of a predetermined virtual address is recovered (in other words, a swap-out point in time) and a restoration point in time (in other words, a swap-in point in time) is smaller than or equal to a threshold, the electronic apparatus 1 increases the access count of that virtual address. On the other hand, when the foregoing time difference is greater than the threshold, the electronic apparatus 1 decreases the access count of that virtual address. Alternatively, when a plurality of tasks or processes concurrently accesses a predetermined virtual address, the electronic apparatus 1 increases the access count of that virtual address. Besides, various criteria may be reflected in the access count. The extent to which the electronic apparatus 1 increases or decreases may be variously changed according to design methods, and thus not limited.

Below, an example of marking the virtual address to be excluded from the swapping target will be described.

Figure 10:
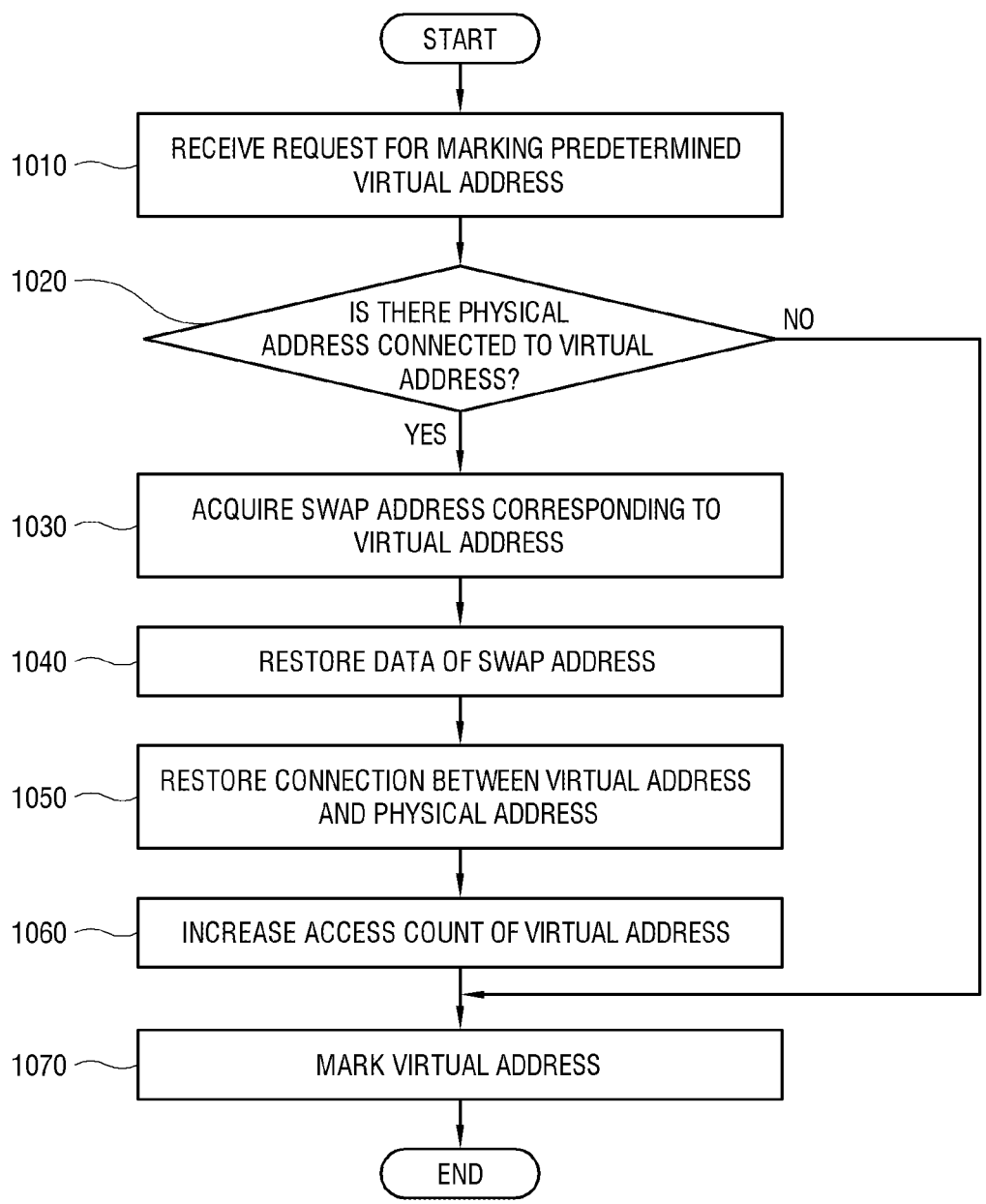
FIG. 10 is a flowchart showing an example that an electronic apparatus marks a virtual address.

FIG. 10 is a flowchart showing an example that an electronic apparatus marks a virtual address.

As shown in FIGS. 2, 5 and 10, the following operations may be performed by the processor 50 of the electronic apparatus 1, or an additional hardware controller provided in the electronic apparatus 1.

At operation 1010 the electronic apparatus 1 receives a request for marking a predetermined virtual address. In this embodiment, the marking of the virtual address is to exclude that virtual address from the swapping target.

At operation 1020 the electronic apparatus 1 identifies whether there is a physical address connected to that virtual address.

When it is identified that there is a physical address connected to the virtual address ("YES" in the operation 1020), the electronic apparatus 1 moves to operation 1070.

On the other hand, when it is identified that there is no physical address connected to the virtual address ("NO" in the operation 1020), at operation 1030 the electronic apparatus 1 acquires the swap address of the second memory 200 corresponding to the virtual address.

At operation 1040 the electronic apparatus 1 restores the data of the acquired swap address to the first memory 100.

At operation 1050 the electronic apparatus 1 restores the connection between the virtual address and the physical address (in other words, the address of the data restored in the first memory 100).

At operation 1060 the electronic apparatus 1 increases the access count of the virtual address.

At operation 1070 the electronic apparatus 1 marks the virtual address, thereby excluding that virtual address from the swap-out target.

Meanwhile, this marking may be released. The electronic apparatus 1 may release the marking of the virtual address in response to a specific event (for example, an event that the processor or other hardware completes recording the physical address corresponding to that virtual address). In this case, that virtual address is included in a swapping-out target.

Below, a method of increasing the reliability of a memory swap will be described.

Figure 11:
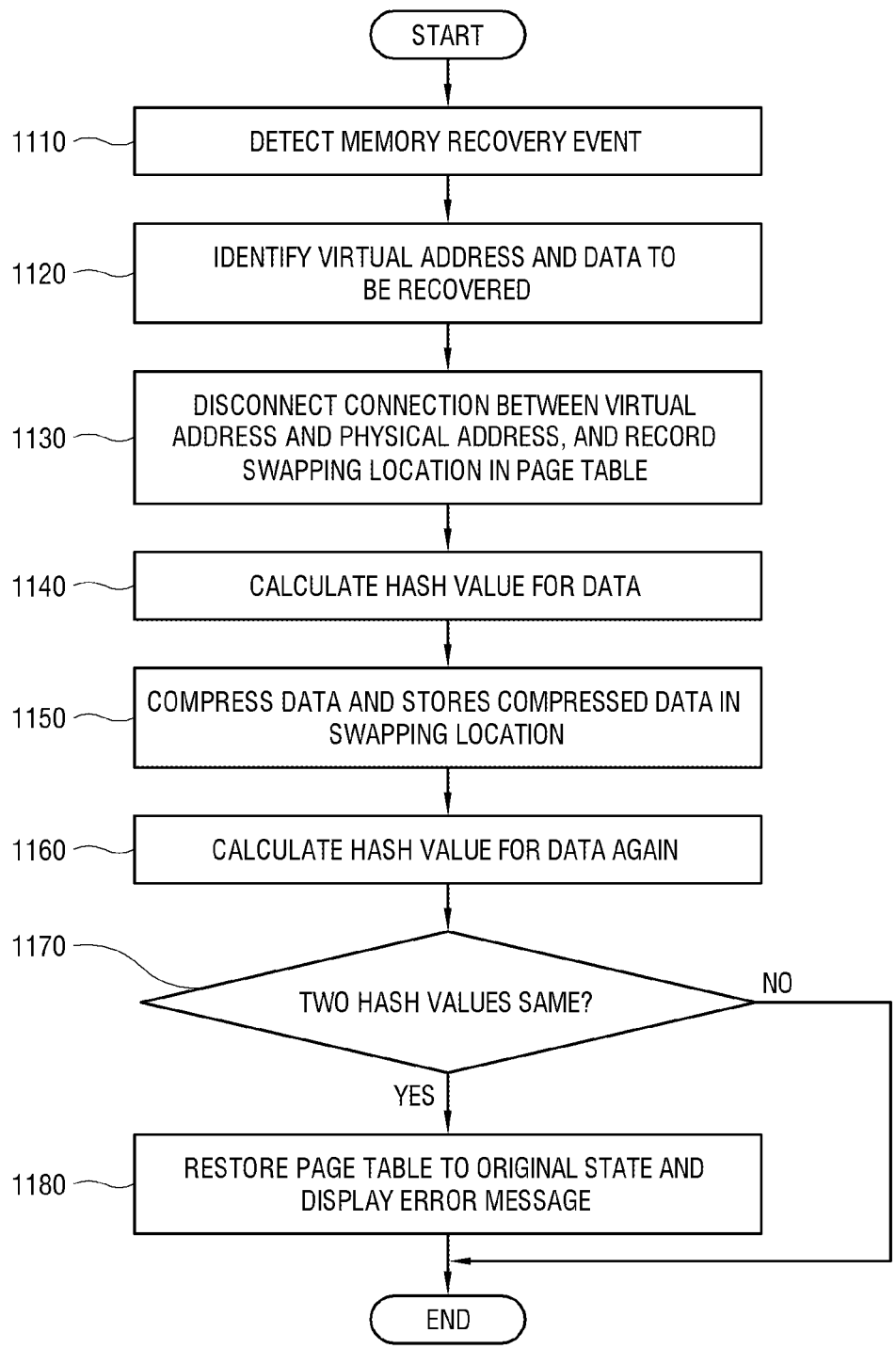
FIG. 11 is a flowchart showing an example method of increasing the reliability of a memory swap.

FIG. 11 is a flowchart showing a method of increasing the reliability of a memory swap.

As shown in FIGS. 2 and 11, the following operations may be performed by the processor 50 of the electronic apparatus 1 or an additional hardware controller provided in the electronic apparatus 1.

At operation 1110 the electronic apparatus 1 detects a memory recovery event.

At operation 1120 the electronic apparatus 1 identifies a virtual address and data to be recovered.

At operation 1130 the electronic apparatus 1 disconnects the connection between the virtual address and the physical address, and records a swapping location in a page table.

At operation 1140 the electronic apparatus 1 calculates a hash value for the data in the first memory 100.

At operation 1150 the electronic apparatus 1 compresses the data and stores the compressed data in the swapping location of the second memory 200.

At operation 1160 the electronic apparatus 1 calculates the hash value for the data again in the first memory 100.

At operation 1170 the electronic apparatus 1 identifies whether the two hash values are the same. When the two hash values are the same ("YES" in the operation 1170), the electronic apparatus 1 terminates the operations.

On the other hand, when the two hash values are not the same ("NO" in the operation 1170), at operation 1180 the electronic apparatus 1 restores the page table to its original state and displays an error message.

Thus, a case where data is changed without synchronization is detectable, thereby improving the reliability of the swapping operation.

The operations of the apparatus described above in the foregoing embodiments may be performed by artificial intelligence installed in the apparatus. The artificial intelligence may be applied to various systems based on machine learning algorithms. The artificial intelligence system refers to a computer system that implements human-level intelligence or near human-level intelligence, in which a machine, device or system autonomously learns and makes a decision, and a recognition rate and a decision accuracy are improved based on accumulated use experiences. Artificial intelligence technology is based on elementary technology by utilizing machine learning technology and algorithms using an algorithm of autonomously classifying/learning features of input data to copy perception, determination and the like functions of a human brain.

The elementary technology may for example include at least one of linguistic comprehension technology for recognizing a language/text of a human, visual understanding technology for recognizing an object like a human sense of vision, inference/prediction technology for identifying information and logically making inference and prediction, knowledge representation technology for processing experience information of a human into knowledge data, and motion control technology for controlling a vehicle's automatic driving or a robot's motion.

Here, the linguistic comprehension refers to technology of recognizing and applying and processing a human's language or character, and includes natural language processing, machine translation, conversation system, question and answer, speech recognition and synthesis, etc.

The inference/prediction refers to technology of identifying information and logically making prediction, and includes knowledge and possibility-based inference, optimized prediction, preference-based plan, recommendation, etc.

The knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic apparatus comprising:
a first memory;
a second memory; and
at least one processor comprising processing circuitry, the at least one processor, individually and/or collectively, configured to:
perform a memory recovery for the first memory, at least by storing data of a user process related to a user area assigned to the first memory and/or a system process related to a system area assigned to the first memory in the second memory, wherein an area of the first memory corresponding to at least one of the user area or the system area is allowed to store other data,
in response to occurring an access of a first process to the data stored in the second memory through the system area, start a restoration of the data stored in the second memory to the first memory according to the access of the first process, and
in response to identifying that there is an access of a second process to the data stored in the second memory before the restoration of the data according to the access of the first process is completed:
(a) complete the restoration of the data according to the access of the first process, and prevent performing a restoration of the data stored in the second memory to the first memory according to the access of the second process, or
(b) start the restoration of the data according to the access of the second process and prevent performing the restoration of the data according to the access of the first process.

2. The electronic apparatus of claim 1, wherein the at least one processor, individually and/or collectively, is configured to compare the first process and the second process with respect to priority, and execute one of the first process and the second process having a high priority.

3. The electronic apparatus of claim 1, wherein
the system area comprises a virtual address provided to be assigned to a physical address of the first memory, and
the at least one processor, individually and/or collectively, is configured to prevent the data from being restored based on the virtual address being set to be connected to a physical address of the data, and restore the data based on the virtual address not being set to be connected to a physical address of the data.

4. The electronic apparatus of claim 1, wherein the at least one processor, individually and/or collectively, is configured to decompress compressed and stored data in the second memory and restore the decompressed data to the first memory.

5. The electronic apparatus of claim 1, wherein the at least one processor, individually and/or collectively, is configured to put an operation based on the access of the second process on standby, in response to the identification of the access of the second process before completing an operation of storing data of the first process in the second memory during the memory recovery event.

6. The electronic apparatus of claim 1, wherein
the system area comprises a plurality of virtual addresses provided to be assigned to physical addresses of the first memory, and
the at least one processor, individually and/or collectively, is configured to select data corresponding to a virtual address having a low access count among the plurality of virtual addresses and store the selected data in the second memory during the memory recovery event.

7. The electronic apparatus of claim 6, wherein the at least one processor, individually and/or collectively, is configured to increase the access count for the virtual address based on a time between a point of storing data corresponding to the virtual address in the second memory and a point of restoring the data to the first memory, the time being shorter than or equal to a threshold, and to decrease the access count based on the time being longer than the threshold.

8. The electronic apparatus of claim 6, wherein the at least one processor, individually and/or collectively, is configured to increase the access count for the virtual address based on occurrence of multiple accesses to the virtual address.

9. The electronic apparatus of claim 1, wherein
the system area comprises a virtual address provided to be assigned to a physical address of the first memory, and
the at least one processor, individually and/or collectively, is configured to prevent data of the physical address from being stored in the second memory, based on identification of a direct hardware access of the electronic apparatus to the physical address without using the virtual address during the memory recovery event.

10. The electronic apparatus of claim 1, wherein the at least one processor, individually and/or collectively, is configured to compress data of the first memory and to store the compressed data in the second memory.

11. The electronic apparatus of claim 1, wherein the at least one processor, individually and/or collectively, is configured to identify occurrence of the memory recovery event based on an available capacity of the first memory decreasing below a threshold.

12. The electronic apparatus of claim 1, wherein
the system area comprises a virtual address provided to be assigned to a physical address of the first memory, and
the at least one processor, individually and/or collectively, is configured to identify occurrence of the memory recovery event based on an access to the virtual address disconnected from the physical address.

13. The electronic apparatus of claim 1, wherein the second process is a kernel process.

14. The electronic apparatus of claim 1, wherein the first process and the second process are performed during a kernel mode.

15. A method of controlling an electronic apparatus, the method comprising: performing a memory recovery for a first memory, by at least storing data of a user process related to a user area assigned to the first memory and/or a system process related to a system area assigned to the first memory in a second memory, wherein an area of the first memory corresponding to at least one of the user area or the system area is allowed to store other data;
identifying occurring an access of a first process to the data stored in the second memory through the system area;
in response to occurring the access of the first process to the data stored in the second memory through the system area, starting a restoration of the data stored in the second memory to the first memory according to the access of the first process;
identifying that there is an access of a second process to the data stored in the second memory before the restoration of the data according to the access of the first process is completed; and
in response to identifying that there is the access of the second process to the data stored in the second memory before the restoration of the data according to the access of the first process is completed;
(a) completing the restoration of the data according to the access of the first process, and preventing performing a restoration of the data stored in the second memory to the first memory according to the access of the second process, or
(b) starting the restoration of the data according to the access of the second process and preventing performing the restoration of the data according to the access of the first process.

16. The method of claim 15, further comprising comparing the first process and the second process with respect to priority, and executing one of the first process and the second process having a high priority.

17. The method of claim 15, wherein
the system area comprises a virtual address provided to be assigned to a physical address of the first memory, and
the method further comprising preventing the data from being restored based on the virtual address being set to be connected to a physical address of the data, and restoring the data based on the virtual address not being set to be connected to a physical address of the data.

18. The method of claim 15, wherein the system area comprises a plurality of virtual addresses provided to be assigned to physical addresses of the first memory, and the method comprises: selecting data corresponding to a virtual address having a low access count among the plurality of virtual addresses and store the selected data in the second memory during the memory recovery event.

19. The method of claim 18, comprising increasing an access count for the virtual address having the low access count based on a time between a point of storing data corresponding to the virtual address having the low access count in the second memory and a point of restoring the data to the first memory, the time being shorter than or equal to a threshold, and to decrease the access count based on the time being longer than the threshold.

* * * * *